(12) United States Patent
Yamamuro

(10) Patent No.: US 8,908,230 B2
(45) Date of Patent: Dec. 9, 2014

(54) CONTROL APPARATUS AND NON-TRANSITORY COMPUTER-READABLE STORAGE MEDIUM

(71) Applicant: Konica Minolta, Inc., Chiyoda-ku (JP)

(72) Inventor: Tatsuro Yamamuro, Kashiwa (JP)

(73) Assignee: Konica Minolta, Inc., Shibuya-Ku, Tokyo (JP)

( * ) Notice: Subject to any disclaimer, the term of this patent is extended or adjusted under 35 U.S.C. 154(b) by 0 days.

(21) Appl. No.: 14/151,414

(22) Filed: Jan. 9, 2014

(65) Prior Publication Data

US 2014/0198327 A1 Jul. 17, 2014

(30) Foreign Application Priority Data

Jan. 16, 2013 (JP) ................................. 2013-005319

(51) Int. Cl.
*H04N 1/60* (2006.01)
*G06F 15/00* (2006.01)

(52) U.S. Cl.
CPC .................................. *H04N 1/6044* (2013.01)
USPC ........... 358/1.9; 358/3.06; 358/518; 358/448; 358/515; 358/538; 348/222.1; 348/223.1; 348/280; 348/273; 382/162; 382/167; 347/225; 347/233

(58) Field of Classification Search
None
See application file for complete search history.

(56) References Cited

U.S. PATENT DOCUMENTS 8,386,924 B2 * 2/2013 Fitzsimons et al. ........... 715/249
2009/0195797 A1 * 8/2009 Mestha et al. ................. 358/1.9

FOREIGN PATENT DOCUMENTS

JP 2005-181673 A 7/2005

* cited by examiner

*Primary Examiner* — Quang N Vo
(74) *Attorney, Agent, or Firm* — Buchanan Ingersoll & Rooney PC

(57) ABSTRACT

Provided is a control apparatus for controlling an image forming apparatus including an inline sensor. The control apparatus includes: a data analyzing section configured to extract color information contained in an image of a target page positioned a predetermined number of pages after a certain page, where the predetermined number of pages are pages to be printed during at least a period from print processing for the certain page to measurement of color information on the printed image of the certain page; a color patch creating section configured to create a color patch corresponding to the color information contained in the image of the target page and arrange the color patch in the certain page; and a control section configured to send image data of the certain page to the image forming apparatus so as to make the image forming apparatus perform print processing and measuring color information.

10 Claims, 6 Drawing Sheets

CONTROL APPARATUS AND NON-TRANSITORY COMPUTER-READABLE STORAGE MEDIUM

This application is based on Japanese Patent Application No. 2013-005319 filed on Jan. 16, 2013, in the Japan Patent Office, the entire content of which is hereby incorporated by reference.

TECHNICAL FIELD

The present invention relates to a control apparatus and a non-transitory computer-readable storage medium storing a control program, in particular to a control apparatus for controlling an image forming apparatus equipped with an inline sensor and a non-transitory computer-readable storage medium storing a control program to be executed in the control apparatus.

BACKGROUND

Image forming apparatuses, such as copying machines and MFPs (Multi Function Peripherals) which are equipped with a color printing function, are now popularly used. In the case where color printing is conducted by using such an image forming apparatus, it is important to perform color administration in order to reproduce correctly colors contained in each page of a job. Then, the conventional color administration has been performed in the following ways. An inline sensor disposed in an image forming apparatus is configured to measure a color patch arranged on an end of a printed matter (paper sheet), and a controller to control the image forming apparatus is configured to compare color information extracted from a job with color information read with the inline sensor so as to acquire an amount of a change of each color, and to perform feedback control of colors in real time so as to make the amount of the change of each color fall in a proper range.

With regard to such the feedback control, Japanese Unexamined Patent Publication (JP-A) No. 2005-181673 discloses an electro-photographic color image forming apparatus which superimposes multi-colored toner images on a transfer sheet so as to form a full color image. This color image forming apparatus includes a color optical density sensor disposed so as to measure an after-fixing image density (i.e., the image density of an image after fixing) and is configured to perform feedback control so as to minify a difference between the write-in data of a measurement target image and the measurement result of the target image by the color optical density sensor. The color image forming apparatus is further configured to calculate an amount of a shrink of an image caused at the time of fixing processing based on the relationship between the position information of an after-fixing image and the position information of a before-fixing write-in image, to calculate an after-fixing position of a measurement target image to be used to measure the image density of an after-fixing image based on the above calculation result, and to measure the image density of the measurement target image based on the above calculation result.

The functionality of RIP (Raster Image Processor) processing to rasterize the data of a job so as to produce image data for each page has been made higher from year to year. In particular, in color printing, it becomes possible to conduct highly-skilled setting in image forming apparatuses so as to perform color administration by setting a tone curve and a color profile for each kind of objects and each color space.

However, in order to perform feedback control for each kind of objects and each color space, it is necessary to arrange a lot of color patches prepared for each kind of objects and each color space at an end portion of a printed sheet. Accordingly, it is difficult to secure a space to arrange a lot of color patches in a printed matter. Further, if colors to form the color patches are limited in order to minify the space, color patches for colors contained mainly in a printed matter can be dropped, which causes the case that appropriate color administration cannot be performed. The present invention seeks to solve the problem.

SUMMARY

There are disclosed illustrative control apparatuses and non-transitory computer-readable storage media each storing a control program.

An illustrative control apparatus reflecting one aspect of the present invention is a control apparatus for controlling an image forming apparatus. The image forming apparatus comprises a print processing section configured to print an image on a sheet of paper and an inline sensor configured to measure color information of the image after the print processing section prints the image on the sheet. The control apparatus comprises: a data analyzing section configured to extract color information to be used for a certain page, where the color information is contained in an image of a target page positioned a predetermined number of pages after the certain page, and the predetermined number of pages are pages to be printed on sheets during at least a period from a time when the print processing section prints an image of the certain page on a sheet to a time when the inline sensor measures color information of the image of the certain page printed on the sheet. The apparatus further comprises: a color patch creating section configured to create a color patch or color patches corresponding to the color information contained in the image of the target page and arrange the color patch or color patches in the certain page; and a control section configured to send image data of the certain page in which the color patch or color patches are arranged to the image forming apparatus so as to make the image forming apparatus perform print processing based on the image data and measuring color information.

An illustrative non-transitory computer-readable storage medium reflecting one aspect of the present invention stores a control program to be executed in a control apparatus for controlling an image forming apparatus. The image forming apparatus includes a print processing section configured to print an image on a sheet of paper and an inline sensor configured to measure color information of the image after the print processing section prints the image on the sheet. The control program causes a processor of the control apparatus to execute processing comprising: extracting color information to be used for a certain page, where the color information is contained in an image of a target page positioned a predetermined number of pages after the certain page, and the predetermined number of pages are pages to be printed on sheets during at least a period from a time when the print processing section prints an image of the certain page on a sheet to a time when the inline sensor measures color information of the image of the certain page printed on the sheet. The processing further comprises creating a color patch or color patches corresponding to the color information contained in the image of the target page; arranging the color patch or color patches in the certain page; and sending image data of the certain page in which the color patch or color patches are arranged to the image forming apparatus so as to make the image forming apparatus perform print processing based on the image data and measuring color information.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Figure 1:
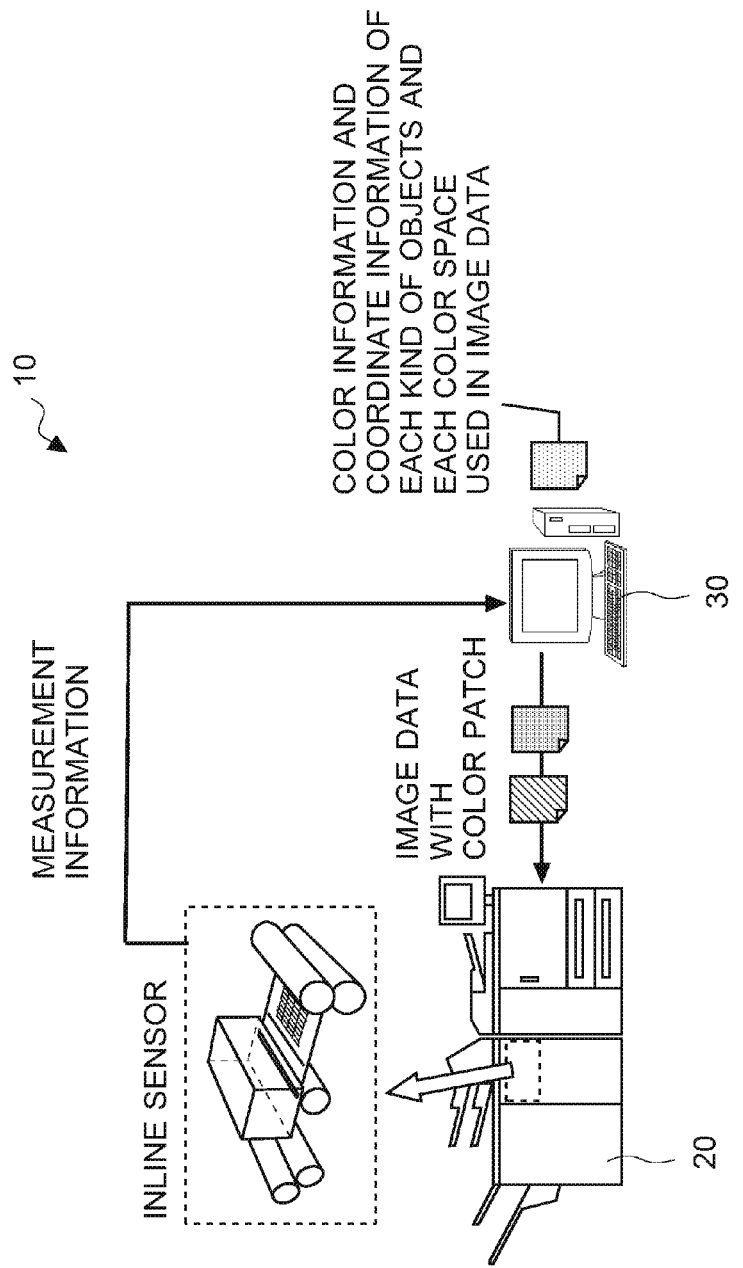
FIG. 1 is a diagram illustrating a constitution and outline operations of a printing system pertaining to one embodiment of the present invention.

Illustrative embodiments of control apparatuses and non-transitory computer-readable media each storing a control program will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the control apparatuses and non-transitory computer-readable media each storing a control program as the illustrative embodiments, in the case where an image forming apparatus equipped with an inline sensor conducts color printing, appropriate color administration can be performed while reducing the number of color patches.

The reason is that the control apparatus (control program) can realize control to arrange only a color patch or patches necessary for color administration of respective pages (only a color patch or patches which are to be used for a certain page and correspond to color information contained in the image of a page to be printed afterward and not contained in the image of the certain page), rather than to arrange color patches corresponding to all the pieces of color information about kinds of objects and color spaces in respective pages.

As illustrated in the description about the background, in a printing system which includes an image forming apparatus equipped with an inline sensor, in the case where highly-skilled color administration is performed by setting a tone curve and a color profile for each kind of objects and each color space, there are problems that the number of color patches necessary for color administration becomes so many that a space to arrange color patches becomes short. If colors to be used for the color patches are limited in view of the problem, color patches for colors mainly contained in a printed sheet can be dropped, which results in the problem that appropriate color administration cannot be performed.

In view of that, in a control apparatus, as an embodiment of the present invention, for controlling an image forming apparatus including an inline sensor, the following processing is performed. There is calculated a period from a time when an image of a certain page is printed with a print processing section of the image forming apparatus to a time when color information of the image of the certain page is measured with the inline sensor. Color information contained in an image of a target page which is a page to be processed a predetermined number of pages after the certain page, is extracted, where the predetermined number of pages are pages to be printed during at least the calculated period. A color patch or color patches corresponding to the color information corresponding to the image of the target page are created and the created color patch or color patches are arranged in the certain page. The image data of the certain page in which the color patch or patches are arranged is sent to the image forming apparatus so as to make the image forming apparatus perform print processing based on the image data and measuring color information. In other words, in the embodiment, there is arranged only color patch(es) necessary for color administration of the certain page (only color patch(es) corresponding to color information contained in the target page and not contained in the certain page) in the certain page, rather than color patches corresponding to all the pieces of color information about kinds of objects and color spaces, in the predetermined page.

In concrete terms, there is defined a page of a feedback destination to which the measurement information prepared by measuring a certain page with the inline sensor is fed-back with going back across several pages. Then, color information used in the page giving the feedback (the certain page) and color information used in the page of the feedback destination (the page positioned the predetermined pages after the certain page) are compared to define color information used in the image of the page of the feedback destination and not used in the page giving the feedback. A color patch or color patches of the defined color information is arranged in the page of the feedback destination.

With this, the number of color patches arranged at an end portion of a printed sheet is kept to the minimum, highly-skilled setting to set a tone curve and a profile for each kind of objects and each color space can be made possible, and appropriate color administration can be performed.

EXAMPLE

Figure 2:
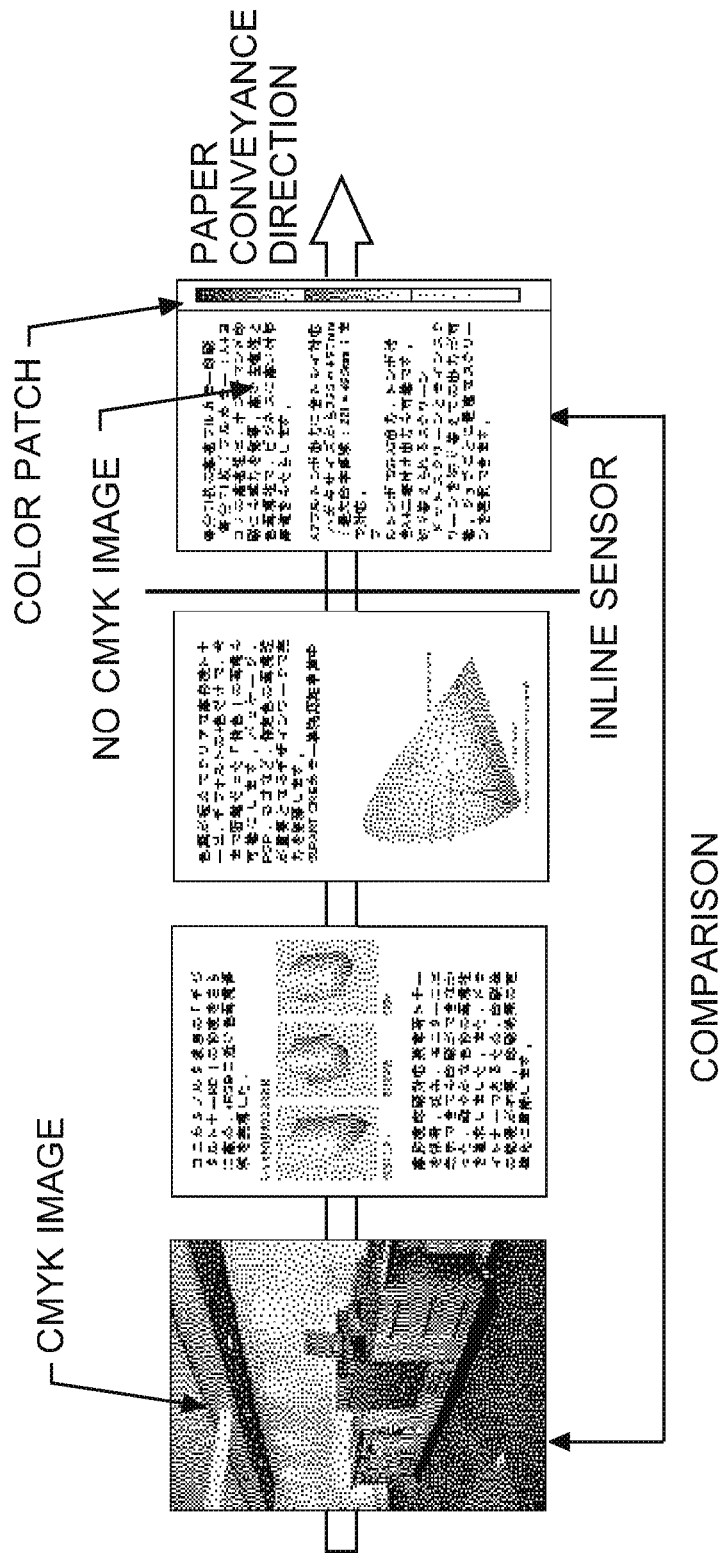
FIG. 2 is a diagram illustrating a constitutional example of a color patch pertaining to one embodiment of the present invention.
Figure 3:
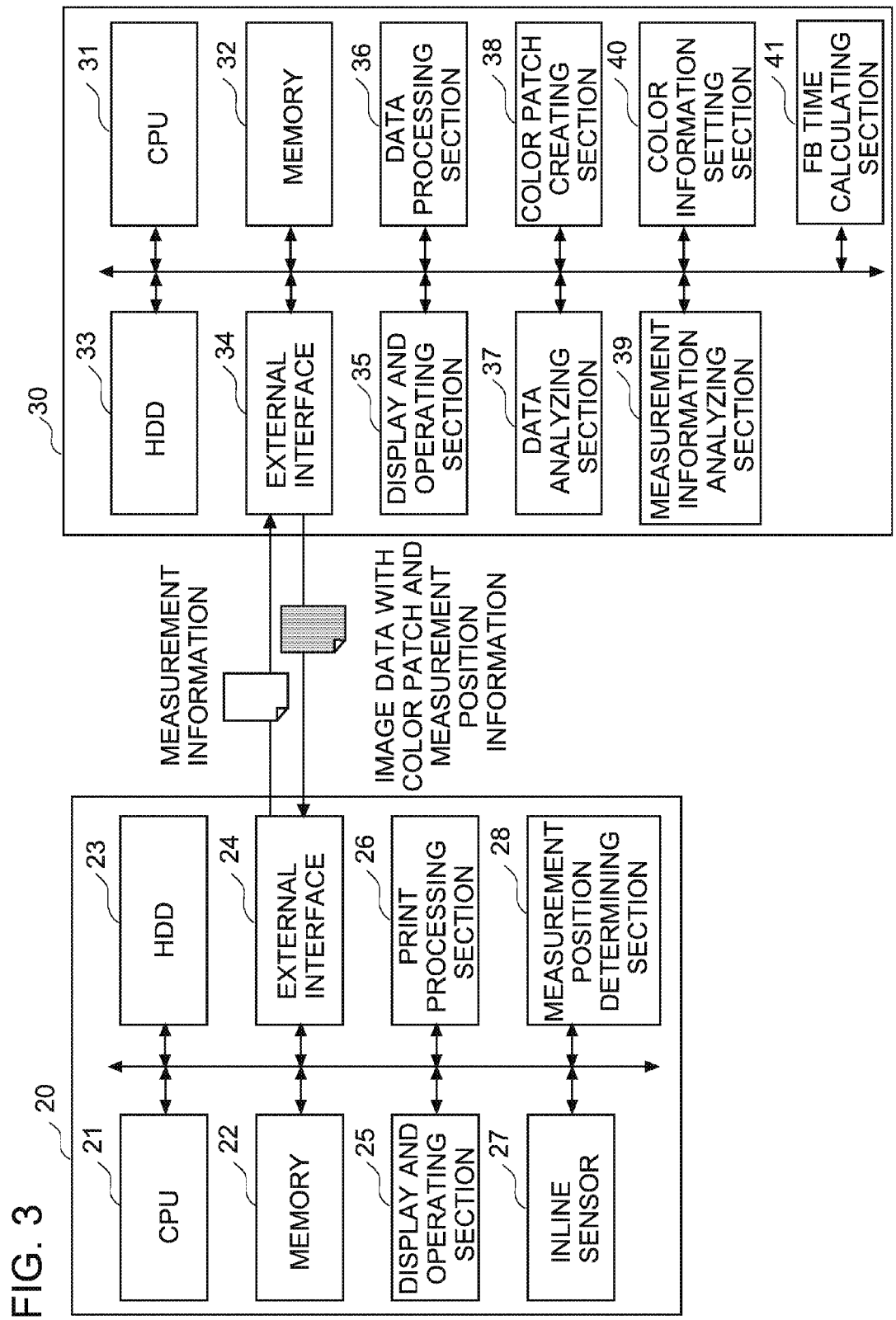
FIG. 3 is a block diagram illustrating a constitution of the printing system pertaining to one embodiment of the present invention.
Figure 4:
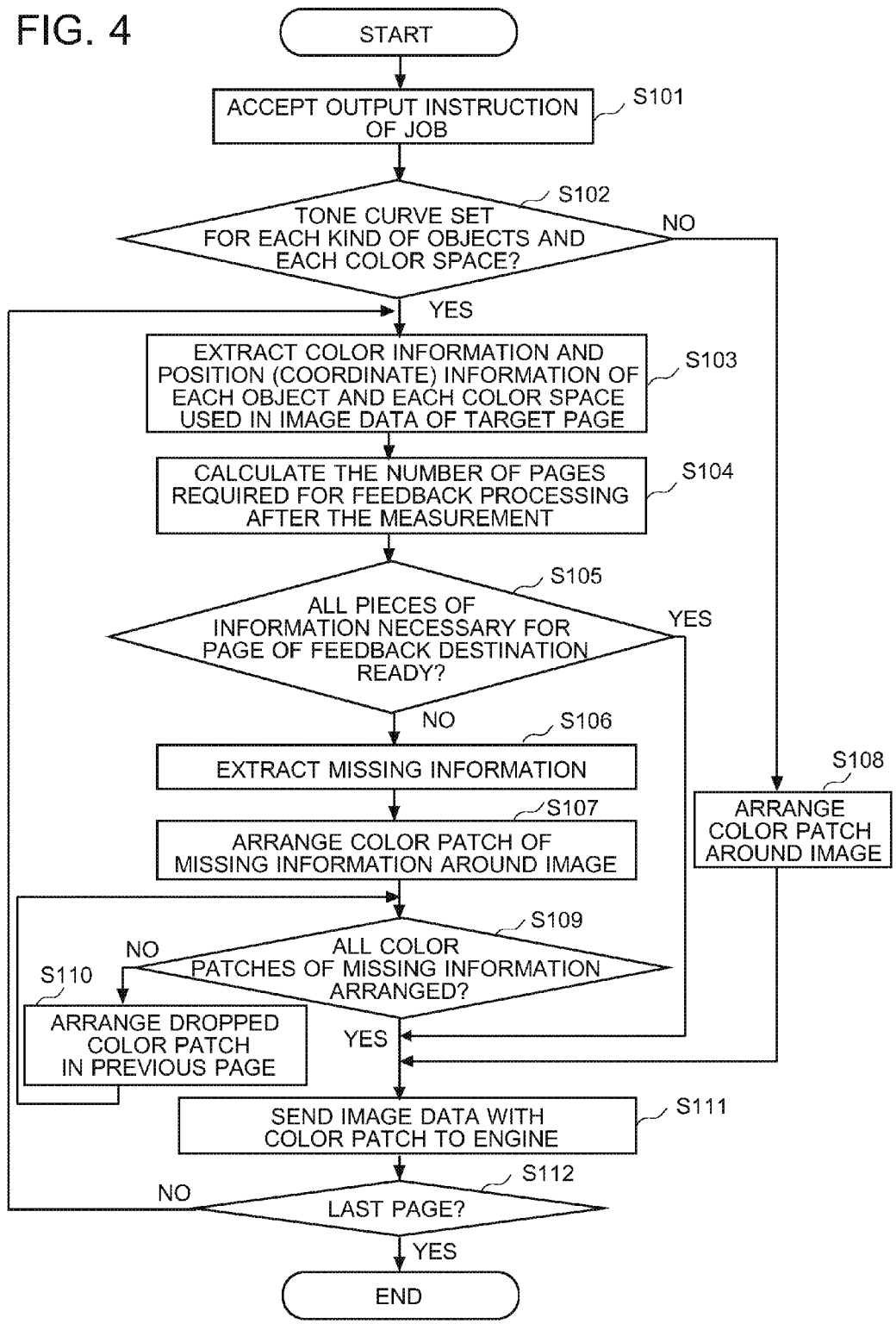
FIG. 4 is a flow chart illustrating processing (arrangement processing of a color patch) of a control apparatus pertaining to one embodiment of the present invention.
Figure 5:
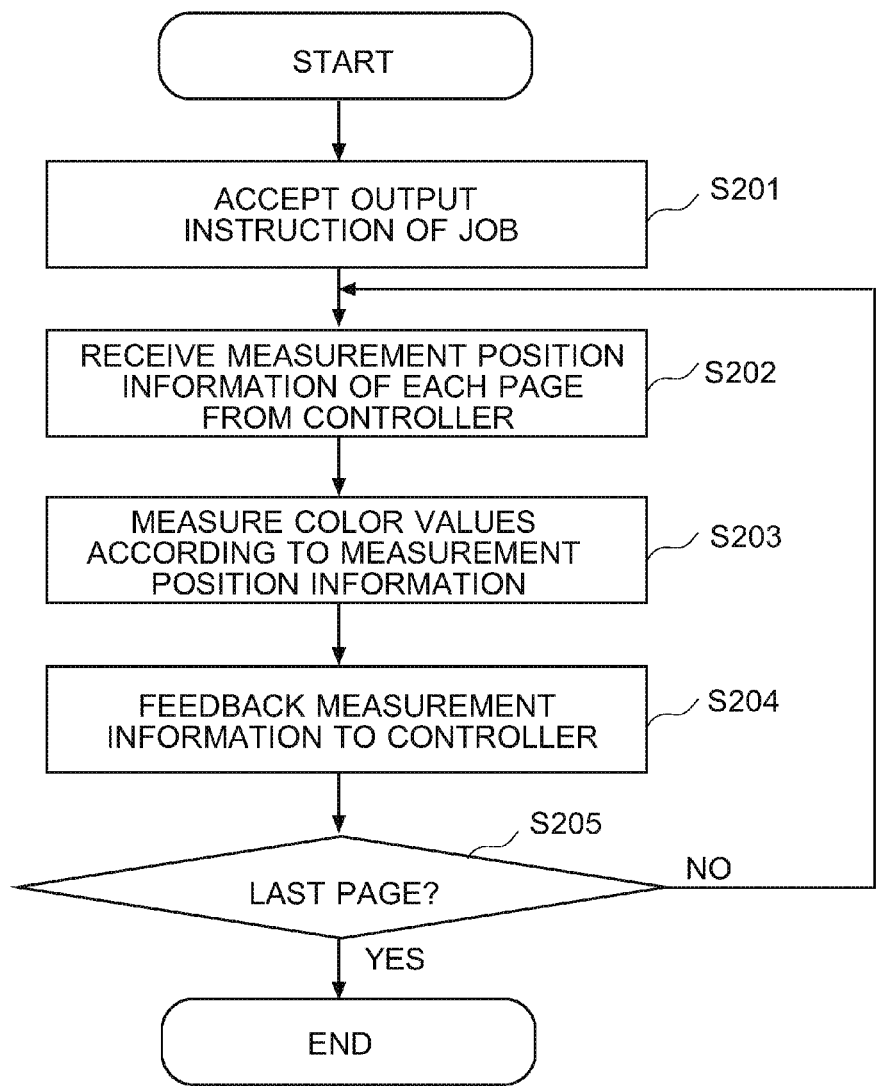
FIG. 5 is a flow chart illustrating processing (measurement processing of color information) of an image forming apparatus pertaining to one embodiment of the present invention.
Figure 6:
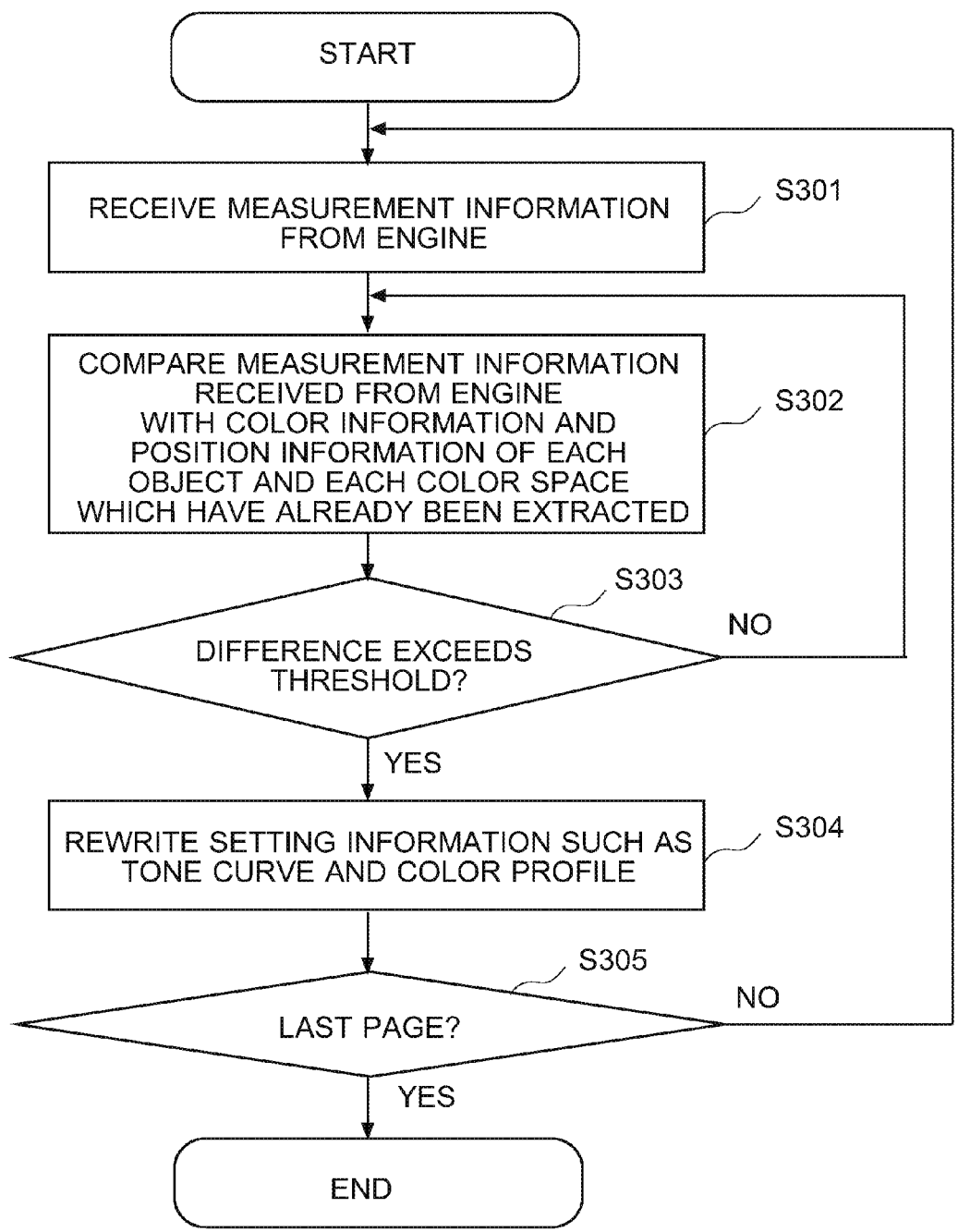
FIG. 6 is a flow chart illustrating processing (rewrite processing of setting information) of the control apparatus pertaining to one embodiment of the present invention.

In order to describe the above-mentioned embodiments in more detail, description will be given to a control apparatus and a non-transitory computer-readable medium storing a control program pertaining to one example of the present invention with reference to FIGS. 1 to 6. FIG. 1 is a diagram illustrating a constitution and outline operations of a printing system of the present example, and FIG. 2 is a diagram illustrating a constitutional example of a color patch of the present example. Further, FIG. 3 is a block diagram illustrating a constitution of the printing system in the present example, and each of FIGS. 4 to 6 is a flow chart illustrating processing of each apparatus in the printing system of the present example.

As shown in FIG. 1, the printing system 10 of the present example includes an image forming apparatus (working as an engine) 20, such as a MFP which can conduct color printing, and a control apparatus (working as a controller) 30 which controls the image forming apparatus 20. Here, in the present example, although the image forming apparatus (as an engine) 20 and the control apparatus (as a controller) 30 are made as the respective separate apparatuses, these apparatuses may be integrally constituted in a single body. Hereafter, the outline operations of the printing system 10 will be described.

First, the control apparatus 30 sets a tone curve and a color profile for each kind of objects (for example, image, graphic and text) and each color space (for example, CMYK, RGB, and Gray) (Process [1]).

Next, the control apparatus 30 extracts color information and coordinate information of each object and each color space which are used in the image data of each page of a job (Process [2]).

Next, the control apparatus 30 calculates the number of pages across which the measurement information prepared by the inline sensor on a certain page is returned as feedback, based on the size of sheets of paper, the kind of the sheets, an output speed, a rewriting speed of the setting information, and the like (Process [3]). Subsequently, the control apparatus 30 extracts color information contained in an image of the page positioned a calculated number of pages after the certain page, and arranges a color patch or color patches corresponding to the extracted color information (concretely, a color patch or color patches of missing color information in the certain page in comparison with the extracted color information of the page positioned the predetermined number of pages after the certain page) in the certain page.

For example, as shown in FIG. 2, on the supposition that a page to receive feedback is positioned backward by three pages from a certain page, the image of a page of the feedback destination positioned backward by three pages (here, the page of the feedback destination is the page arranged at the left end in FIG. 2) is constituted by only image information of CMYK, and the image of a page giving the feedback (here, the page giving the feedback is the page arranged at the right end in FIG. 2) is constituted by text information of CMYK or by a combination of text information and graphic information of CMYK. In the above case, since the image information of CMYK is missing in the page giving the feedback, a color patch corresponding to the image information of CMYK is arranged at a periphery of the image of the page giving the feedback (here, at the right side end portion of the sheet). Successively, the control apparatus 30 sends the image data of the page giving the feedback attached with the color patch to the image forming apparatus 20 (Process [4]).

In response to acquiring the image data attached with the color patch from the control apparatus 30, the image forming apparatus 20 performs printing and fixing processing based on the image data attached with the color patch (Process [5]). Successively, the image forming apparatus 20 measures color values of the printed sheet after the fixing processing by using the inline sensor, and then returns the measurement information as feedback to the control apparatus 30 (Process [6]). Here, the positions to be measured by the inline sensor correspond to a portion specified by the coordinate information of the object extracted in Process [2] from the image printed on the page and to a portion of the color patch arranged at the periphery of the image in Process [4].

Subsequently, the control apparatus 30 acquires a change amount of each color (a difference between the color information extracted from the image data of a page of the feedback destination and the color information obtained by measuring the image and the color patch printed on the page giving the feedback) based on the measurement information fed back from the image forming apparatus 20. When the change amount of each color exceeds a predetermined threshold value, the control apparatus 30 rewrites setting information such as a tone curve and a color profile set in Process [1] so as to stabilize the color reproduction (Process [7]).

Next, with reference to a block diagram shown in FIG. 3, description will be given to a hardware constitution in an image forming apparatus 20 and a control apparatus 30 for realizing the above control.

Image Forming Apparatus:

The image forming apparatus (as an engine) 20 includes a CPU (Central Processing Unit) 21, a memory 22, a HDD (Hard Disk Drive) 23, an external interface 24, a display and operating section 25, a print processing section 26, an inline sensor 27, and a measurement position determining section 28.

The CPU 21 and the memory 22, such as a ROM (Read Only Memory) and a RAM (Random Access Memory), constitute a control section. The ROM is configured to memorize control programs, data necessary for control, and the like. The RAM is configured to memorize data necessary for control performed by the CPU 21, data needed to be memorized temporarily at the time of control operations, and the like. Meanwhile, the CPU 21 is configured to control the whole operations of the image forming apparatus 20 in cooperation with the ROM and the RAM.

The HDD 23 is configured to memorize image data with a color patch sent from the control apparatus 30, measurement position information indicating positions at which color values are to be measured, and the like.

The external interface 24 includes a NIC (Network Interface Card) and a modem, and is configured to receive image data with a color patch, measurement position information, and the like from the control apparatus 30, and to send measurement information of color values measured by the inline sensor 27 to the control apparatus 30.

The display and operating section 25 includes a touch panel in which an operating section, such as a touch sensor, is arranged on a display unit, such as a LCD (Liquid Crystal Display), and is configured to allow a user to perform various kinds of indication and operation with regard to printing.

The print processing section 26 is configured to form (print) an image on a sheet of paper in accordance with an electro-photographic process based on image data with a color patch received from the control apparatus 30. In concrete terms, the print processing section 26 includes a writing unit which performs exposure by irradiating a laser beam based on image data; a photo conductor unit which includes a photo conductor drum, a developing device, an electric charging device, a photo conductor cleaning device, and a primary transfer roller, and forms respective color toner images of CMYK; an intermediate transfer belt which is rotated by rollers and functions as an intermediate transfer member to convey toner images formed by the photo conductor unit to a sheet; a secondary transfer roller which transfers toner images formed on the intermediate transfer belt to a sheet; a fixing device which fixes the toner images transferred onto the sheet; and a conveyance unit which includes a sheet feed roller which conveys sheets of paper, a registration roller, a loop roller, a reversing roller, and a sheet discharging roller.

The inline sensor 27 is configured to measure color information of an image of a sheet of paper after the image has been printed on the sheet by print processing section 26. Concretely, the inline sensor 27 includes three kinds, for example, RGB, of sensors disposed on a conveyance passage between the fixing device and a discharged sheet tray, and is configured to measure color values based on output values (RGB values) from the three kinds of sensors for each portion of a color image and to output measurement information.

The measurement position determining section 28 is configured to determine positions, on which color values are to be measured, based on measurement position information transmitted from the control apparatus 30, and to instruct the inline sensor 27 to measure color values.

Control Apparatus:

The control apparatus (as a controller) 30 includes a CPU 31, a memory 32, a HDD 33, an external interface 34, a display and operating section 35, a data processing section 36, a data analyzing section 37, a color patch creating section 38, a measurement information analyzing section 39, a color information setting section 40, and a FB (feedback) time calculating section 41.

The CPU 31 and the memory 32, such as a ROM and a RAM, constitute a control section. The ROM is configured to memorize control programs, data necessary for control, and the like. The RAM is configured to memorize data necessary for control performed by the CPU 31, data needed to be memorized temporarily at the time of control operations, and the like. Meanwhile, the CPU 31 is configured to control the whole operations of the control apparatus 30 in cooperation with the ROM and the RAM.

The HDD 33 is configured to memorize the data of each job, the image data of each page, color information and position (coordinate) information extracted from the image data of each page, image data with a color patch, and the like.

The external interface 34 includes a NIC and a modem, and is configured to send image data with a color patch, measurement position information, and the like to the image forming apparatus 20 in response to instructions of the control section of the control apparatus, and to receive measurement information measured by the inline sensor 27 and the like from the image forming apparatus 20.

The display and operating section 35 includes a touch panel in which an operating section, such as a touch sensor, is arranged on a display unit, such as a LCD, and is configured to allows an operator to perform various kinds of indication and operation with regard to printing.

The data processing section 36 is configured to analyze the data of a job memorized in the HDD 33, or the data of a job acquired from a client connected to a communication network, to perform a rasterizing process, and to produce the image data of each page.

The data analyzing section 37 is configured to analyze the image data of each page, to extract color information and position (coordinate) information of each object (image, graphic, and text) and each color space (CMYK, RGB, and Gray) used in each page of a job, and to judge whether color information necessary for color administration of the job is insufficient or short.

The color patch creating section 38 is configured to create a color patch or color patches corresponding to the missing color information for each page, and to arrange the created color patch or color patches at a predetermined location of the corresponding page (for example, a space around the image of the corresponding page).

The measurement information analyzing section 39 is configured to compare the color information extracted by the data analyzing section 37 with the measurement information measured by the inline sensor 27 of the image forming apparatus 20, and to judge whether a change amount of each color exceeds a predetermined threshold value. The measurement information analyzing section 39 is configured to, when the change amount of a color exceeds the threshold value, rewrite the setting information which has been set in the color information setting section 40, in accordance with the amount of the change of the color.

The color information setting section 40 is configured to set setting information such as a tone curve, a color profile, and the like for each kind of objects and each color space.

The FB time calculating section 41 is configured to calculate the number of pages across which the measurement information measured by the inline sensor 27 is fed-back (the number of pages printed during at least a period since the print processing section 26 prints an image on a sheet until the inline sensor 27 reads the image on the page), based on the information derived from the processing capability of the image forming apparatuses 20, such as the size of the sheet, the kinds of the sheet, and the output speed, and the information derived from the processing capability of the control apparatus 30, such as the rewriting speed of the setting information.

Here, in FIG. 3, the data processing section 36, the data analyzing section 37, the color patch creating section 38, the measurement information analyzing section 39, and the FB time calculating section 41 are constituted by hardware. However, the respective functions of the above sections may be realized by a control program which is stored in a non-transitory computer-readable storage media and is executed in the control section.

Hereafter, description will be given to processing performed in the printing system 10 with the above constitution. First, description is given to arrangement processing of a color patch in the control apparatus 30 according to the present example with reference to the flowchart shown in FIG. 4.

When the control section of the control apparatus 30 accepts an output instruction for a job from an operator (S101), the data processing section 36 analyzes the job and produces image data for each page. Successively, the control section judges whether settings with regard to color, such as a tone curve and a color profile have been made for each kind of objects and each color space (S102). When the settings with regard to color have not been made for each kind of objects and each color space (all the settings have been made similarly in accordance with the conventional way), the color patch creating section 38 creates a color patch corresponding to the color information of each kind of all objects and each color space and arranges the created color patch around the image of the corresponding page (S108).

On the other hand, when the settings with regard to color have been made for each kind of objects and each color space, the data analyzing section 37 extracts the color information and the position (coordinate) information of each object and each color space which are used in the image data of a target page (the page giving feedback, which will be described later) (S103). The extracted information is retained in the HDD 33 in order to enable comparison later when the measurement information is fed-back.

Next, the FB time calculating section 41 calculates a period from a time when the print processing section 26 prints an image on a certain page to a time when the inline sensor 27 measures color information of the image, to obtain the number of pages to be printed in at least the calculated period, in other words, the number of pages required for feedback processing after the measurement, based on the size of a sheet, the kind of the sheet, the output speed, the rewriting speed of the setting information, and the like (S104).

Next, the data analyzing section 37 extracts color information, which is used for a certain page, contained in the image of the page (a page of a feedback destination) positioned backward from the certain page (the page giving feedback) by a number of pages to be printed during at least the period calculated by FB time calculating section 41. Concretely, the data analyzing section 37 extracts color information contained in the image of the page of a feedback destination and color information contained in the image of the page giving the feedback, compares the two types of color information, and checks whether all pieces of information necessary for the color administration of the page of a feedback destination are ready (whether all the pieces of color information contained in the image of the page of the feedback destination are contained in the image of the page giving the feedback) (S105). When the all the pieces of information necessary for the color administration are ready, since there is no need to arrange a color patch newly, the flow skips to S111.

When the pieces of information necessary for the color administration is short, the data analyzing section 37 determines and extracts missing pieces of information (color-information difference which represents pieces of color information contained in the image of the pages of a feedback destination and not contained in the image of the page giving the feedback) (S106). Successively, the color patch creating section 38 creates a color patch or color patches corresponding to the missing pieces of color information, and arranges the created color patch or color patches around the image of the page giving the feedback (S107). That is, the color patch creating section 38 creates a color patch or color patches corresponding to color information excluding pieces of color information contained in the image of the page giving the feedback out of pieces of color information contained in the image of the page of the feedback destination. For example, when a piece of information of an image of CMYK is missing in the page giving the feedback, only the color patch of the image of CMYK is arranged around the image of the page giving the feedback.

Next, the data analyzing section 37 checks whether all the color patches corresponding to the missing information are arranged in the concerned page (S109). When there is a color patch dropped from the page due to the lack of a space, the information of the dropped color patch is memorized in the HDD 33 so as to be arranged in the previous page of the page giving the feedback, for example, when color patches of the previous page are arranged (S110). Here, the reason why the dropped color patch are arranged on the previous page is that if the dropped color patch are arranged on the next page of the page giving the feedback, the measurement information of the color patch is unable to be reflected to the page of the feedback destination.

After the color patches corresponding to pieces of the color information of each kind of objects and each color space are arranged at a periphery of the image in Step 108, or after it is confirmed that all the color patches corresponding to the missing information in one page (or, in the page and the previous page) in Step 109, the control section sends the image data with the color patch or color patches to the image forming apparatus 20 so as to make the image forming apparatus 20 perform print processing and measuring color information. Successively, the data analyzing section 37 judges whether the current page is the last page (S112), if the current page is not the last page, the flow returns to S104, and the same processing is repeated to the next page.

Next, description will be given to the measurement processing of color information in the image forming apparatus 20 according to the present embodiment with reference to the flowchart shown in FIG. 5.

First, upon receipt of image data with a color patch or patches from the control apparatus 30 and acceptance of an output instruction of a job (S201), the control section of the image forming apparatus 20 receives the measurement position information of each page from the control apparatus 30 (S202).

Next, the print processing section 26 prints an image of a page and a color patch(es) on a sheet based on the image data with the color patch(es). Then, the measurement position determining section 28 determines a measurement position in accordance with the measurement position information of the page, makes the inline sensor 27 measure the color values at the measurement position (S203), and sends the measurement information as feedback to the control apparatus 30 (S204).

Successively, the control section judges whether the current page is the last page of the job (S205), if the current page is not the last page, the flow returns to S202, and the same processing is repeated to the next page.

Next, description will be given to the rewrite processing of the setting information in the control apparatus 30 according to the present embodiment with reference to the flowchart shown in FIG. 6.

First, the measurement information analyzing section 39 of the control apparatus 30 receives the measurement information of the inline sensor 27 (measurement result prepared with the inline sensor 27 by measuring color information of the image of the page giving feedback and the color patch or color patches having been printed on a sheet together based on the image data) from the image forming apparatus 20 (S301). Next, the measurement information received from the image forming apparatus 20 at S301 is compared with the color information and the position information which were stored in the HDD 33 at the above-mentioned S104 in FIG. 4 (S302).

Successively, the measurement information analyzing section 39 judges whether a difference between the information stored in the HDD 33 and the measurement information received from the image forming apparatus 20 (a difference between the color information extracted from the image data and the color information measured by the inline sensor 27) exceeds the predetermined threshold value (S303). When the difference exceeds the threshold value, the setting information such as a tone curve, a color profile, and the like stored in the color information setting section 40 (color information which has been set in the control apparatus 30) are rewritten in accordance with the measurement information (S304). Subsequently, the measurement information analyzing section 39 judges whether the current page is the last page (S305), if the current page is not the last page, the flow returns to S301, and the same processing is repeated to the next page.

In this way, in the present embodiment, all of the color patches for kinds of objects and color spaces are not arranged at a periphery of an image of each page. Instead, the number of pages necessary for feedback is calculated, and only a color patch corresponding to a kind of objects and a color space which are contained in the image of a page of a feedback destination and are not contained in the image of the page giving feedback is arranged. Accordingly, the number of color patches can be reduced, and the advanced color administration can be performed while preventing in advance the inconvenience that a color patch of the color information necessary for the color administration is dropped from a certain page, due to lack of a space.

Incidentally, the present invention should not be limited to the above-mentioned example, and the constitution of the printing system 10, the control of the control apparatus 30, and the like may be changed appropriately unless the change deviates from the intention of the present invention.

For example, in the above-mentioned example, the description is given to the case where the inline sensor 27 is configured to read an image after fixing (an image printed on a sheet). However, similarly, the present invention is applicable to the case where the inline sensor 27 is configured to read an image before being transferred to a sheet (an image on a transfer belt).

The invention claimed is:

1. A control apparatus for controlling an image forming apparatus comprising a print processing section configured to print an image on a sheet of paper and an inline sensor configured to measure color information of the image after the print processing section prints the image on the sheet, the control apparatus comprising:
    a data analyzing section configured to extract color information to be used for a certain page, the color information being contained in an image of a target page positioned a predetermined number of pages after the certain page, the predetermined number of pages being pages to be printed on sheets during at least a period from a time when the print processing section prints an image of the certain page on a sheet to a time when the inline sensor measures color information of the image of the certain page printed on the sheet;
    a color patch creating section configured to create a color patch or color patches corresponding to the color information contained in the image of the target page and arrange the color patch or color patches in the certain page; and
    a control section configured to send image data of the certain page in which the color patch or color patches are arranged to the image forming apparatus so as to make the image forming apparatus perform print processing based on the image data and measuring color information.

2. The control apparatus of claim 1,
    wherein the color patch creating section is configured to create the color patch or color patches corresponding to the color information contained in the image of the target page, excluding color information contained in the image of the certain page.

3. The control apparatus of claim 1,
    wherein the data analyzing section is configured to extract and compare the color information contained in the image of the target page and color information contained in an image of the certain page, and define a color-information difference being color information contained in the image of the target page and not contained in the image of the certain page, and
    the color patch creating section is configured to create a color patch or color patches corresponding to the color-information difference.

4. The control apparatus of claim 1,
    wherein the color patch creating section is configured to, on creating a plurality of color patches beyond color patches which can be arranged in the certain page, arrange a color patch which cannot be arranged in the certain page in the previous page.

5. The control apparatus of claim 1 further comprising:
    a measurement information analyzing section is configured to
        acquire a measured color information prepared with the inline sensor by measuring the image of the certain page and the color patch or color patches both having been printed on a sheet of paper with the image forming apparatus based on the image data,
        compare the measured color information with color information contained in the image of the certain page and extracted by the data analyzing section, to calculate a difference between the measured color information and the color information extracted by the data analyzing section, and
        on the difference exceeding a predetermined threshold, change color information which has been set in the control apparatus.

6. A non-transitory computer-readable storage medium storing a control program to be executed in a control apparatus for controlling an image forming apparatus, the image forming apparatus including a print processing section configured to print an image on a sheet of paper and an inline sensor configured to measure color information of the image after the print processing section prints the image on the sheet, the control program causing a processor of the control apparatus to execute processing comprising:
    extracting color information to be used for a certain page, the color information being contained in an image of a target page positioned a predetermined number of pages after the certain page, the predetermined number of pages being pages to be printed on sheets during at least a period from a time when the print processing section prints an image of the certain page on a sheet to a time when the inline sensor measures color information of the image of the certain page printed on the sheet;
    creating a color patch or color patches corresponding to the color information contained in the image of the target page;
    arranging the color patch or color patches in the certain page; and
    sending image data of the certain page in which the color patch or color patches are arranged to the image forming apparatus so as to make the image forming apparatus perform print processing based on the image data and measuring color information.

7. The non-transitory computer-readable storage medium of claim 6,
    wherein the creating the color patch or color patches includes creating the color patch or color patches corresponding to the color information contained in the image of the target page, excluding color information contained in the image of the certain page.

8. The non-transitory computer-readable storage medium of claim 6,
    wherein the extracting the color information to be used for a certain page, includes
        extracting and comparing the color information contained in the image of the target page and color information contained in an image of the certain page, and defining a color-information difference being color information contained in the image of the target page and not contained in the image of the certain page, and
    the creating the color patch or color patches includes creating a color patch or color patches corresponding to the color-information difference.

9. The non-transitory computer-readable storage medium of claim 6,
    wherein the arranging the color patch or color patches in the certain page includes, on creating a plurality of color patches beyond color patches which can be arranged in the certain page, arranging a color patch which cannot be arranged in the certain page in the previous page.

10. The non-transitory computer-readable storage medium of claim 6,
    wherein the processing further comprises
        acquiring a measured color information prepared with the inline sensor by measuring the image of the certain page and the color patch or color patches both having been printed on a sheet of paper with the image forming apparatus based on the image data, comparing the measured color information with color information contained in an image of the certain page and extracted by the data analyzing section, to calculate a difference between the measured color information and the color information extracted by the data analyzing section, and on the difference exceeding a predetermined threshold, changing color information which has been set in the control apparatus.

\* \* \* \* \*